Dec. 20, 1966        W. L. AVES        3,293,064
METHOD OF MAKING HEAT RESISTANT ARTICLE
Filed July 23, 1962
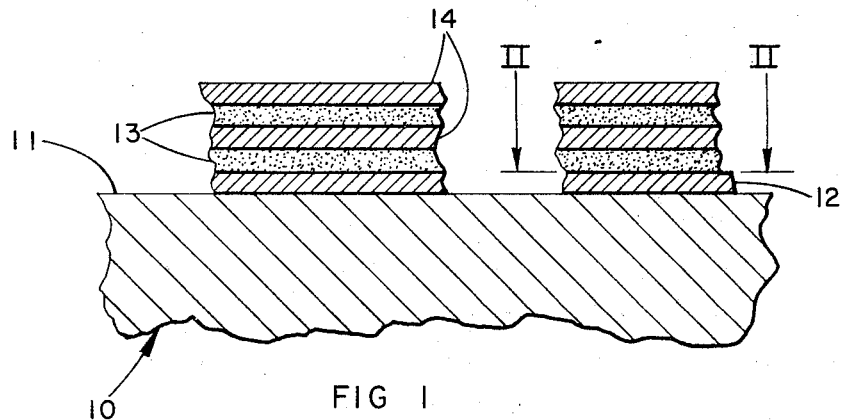
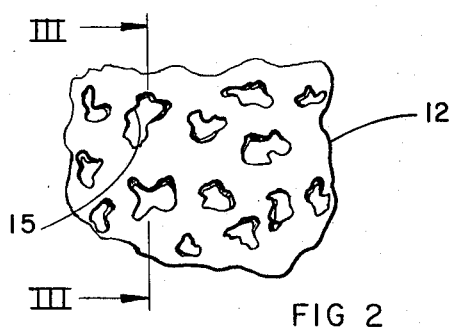
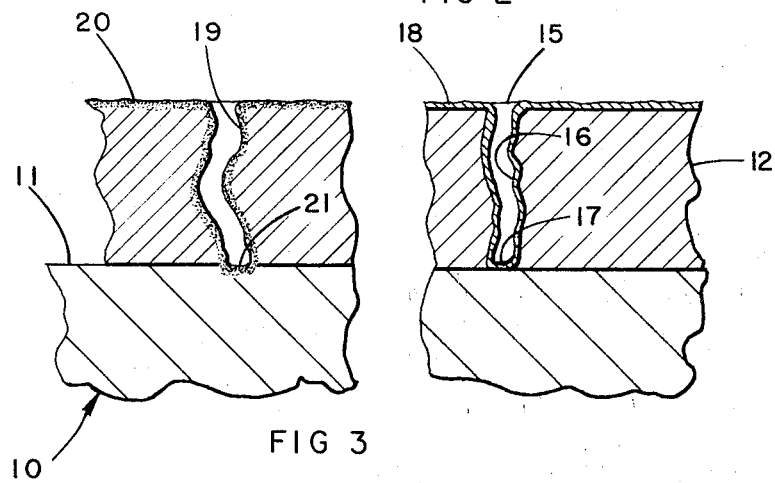
WILLIAM L. AVES
INVENTOR.
BY H.C. Goldwire
AGENT United States Patent Office 3,293,064
Patented Dec. 20, 1966

3,293,064
METHOD OF MAKING HEAT RESISTANT ARTICLE
William L. Aves, Arlington, Tex., assignor to Ling-Temco-Vought, Inc., Dallas, Tex., a corporation of Delaware
Filed July 23, 1962, Ser. No. 211,631
9 Claims. (Cl. 117—46)

This invention relates to a method of making a heat-resistant article and particularly to the protection of a body from the deleterious effects of high temperatures in an atmospheric environment.

Important advances have been made in the field of heat-resistant materials, and certain of these materials including carbon, graphite, cermets, and the refractory metals such as molybdenum, etc. have been found capable of withstanding very high temperatures in a non-oxidizing environment. In many important applications, however, including where a material is used for the outer surfaces of very high-speed aircraft or atmospheric entry vehicles, the chosen material must withstand not only high temperatures but, coupled therewith, oxidizing and erosive effects of an atmospheric environment. Graphite, carbon, some of the cermets, and the refractory metals including molybdenum, for example, can endure very high temperatures without damage when in an oxygen-free medium but are rapidly deteriorated, at high temperatures, in the presence of oxygen.

In an effort to protect these materials from oxidization, their surfaces have been covered with coatings of oxides such as aluminum oxide and zirconium oxide. Applied directly to the protected part, these coatings have tended to spall badly.

To provide better retention of the oxide coating on the protected surface, the latter has been flame-sprayed with a coat of refractory metal such as molybdenum. The flame-sprayed metallic coating bonds well to the protected article and has a porosity which fosters a quite good bond between itself and a subsequently applied oxide coating, for example, a layer of aluminum oxide flame-sprayed on the flame-sprayed molybdenum layer. A layer of zirconium oxide may be flame-sprayed on the aluminum oxide. In some systems, further coats of flame-sprayed molybdenum may be applied between further oxide layers, thus providing a coating made up of a dozen or more layers, a flame-sprayed molybdenum layer always being the first one applied to the protected body.

Within certain limits, these coatings have given excellent results. The lowermost, flame-sprayed, refractory metal layer is applied in small droplets, in the molten state, to the surface of the body protected and has been found to adhere very well to bodies made of a refractory metal, carbon, graphite, or cermet. The inherent porosity of the flame-sprayed materials, both metal and metallic oxide, lends itself to relatively excellent bonding and mechanical interlocking between the coating layers. This some porosity, however, admits atmospheric oxygen to the protected body and especially to the flame-sprayed, refractory metal layers of the coating. The resulting oxidation of the protected body and of the refractory metal layers is quite injurious and undesirable.

It is, accordingly, a major object of the present invention to provide a more reliable, efficacious, and economical method of protecting a body from the deleterious effects of high temperatures in an atmospheric environment.

Other objects and advantages will become apparent from the specifications, claims, and accompanying drawing illustrative of the invention.

In the drawing:

FIGURE 1 is a greatly enlarged, sectional view of a base body to which has been applied a plurality of coatings according to the invention;

FIGURE 2 is a plan view of a portion of the porous, refractory metal coating applied to the base body; and FIGURE 3 is a still further enlarged, sectional view taken as at line III—III of FIGURE 2.

The drawing is highly schematic, and (since it is not necessary for disclosure of the invention) no attempt has been made to show the individual, sprayed particles or the actual form of the microscopic or near-microscopic pores. Similarly, the size of the pores has been exaggerated, especially in FIGURE 3, as has the thickness of the plating, and the course of the pores through the coating is shown schematically. Porosity is inherent in, for example, flame-sprayed coatings; and the pores largely are constituted by the interstices interlying the successively deposited, irregularly shaped and positioned particles of the flame-sprayed material. While generally very small, the pores are interconnected to such degree that some fluids readily pass through a flame-sprayed coating or even an extensive series of coatings.

In the drawing, the base body 10 of FIGURE 1 is made of carbon, graphite, a cermet, or a refractory metal and has a surface 11 which must be protected, in use, from high temperatures and atmospheric oxygen. A porous coating 12 of a refractory metal, for example, molybdenum, overlies the protected body surface 11 and, in a preferred embodiment, is itself overlain by a plurality of porous layers 13 of one or more metallic oxides such as aluminum oxide, hafnium oxide, zirconium oxide, etc. interspersed with a further porous layer or layers 14 of the refractory metal. Because of the porosity of the metal and metallic oxide layers, each metal layer 12 or 14 (in consequence of the surfaces forming the walls of its pores) has a large surface directly or indirectly exposed to the atmosphere and hence subject to the action of oxygen when the body is heated in an atmospheric environment.

As shown in FIGURE 2, the porous metallic coating 12 (as, indeed, are the other coatings, both metal and metallic oxide) is highly provided with pores 15. As shown in FIGURE 3, the walls of the pores, such as the pore 15, are plated as at 16 with a metal chosen from the group including gold, silver, platinum, rhodium, palladium, and iridium. The floors of the pores also tend to be plated as at 17, thus covering any otherwise exposed portions of the surface of the protected body. Depending on how the plating is applied, the surface of the refractory layer opposite the protected body also is plated as at 18. When a succeeding layer of metallic oxide is applied over the metallic coating 12 before plating the latter, portions of the refractory metal coating surface 18 of course will not be plated where they are contacted and covered by the ceramic. In a form of the invention, the chosen metal will not exist purely as a plating, but is diffused into the pore walls and refractory metal surface as at 19, 20 and may also be diffused into the base body (depending upon the material of the latter) at the pore bottoms as at 21.

The method of protecting the body 10 (FIGURE 1) having a surface 11 from the deleterious effects of high temperatures in an atmospheric environment comprises forming the porous coating 12 on its surface by flame-spraying or otherwise depositing on its surface, in small droplets, a molten, refractory metal such as molybdenum. The outer surface, pore walls, and pore floors of the coating 12 then are plated, as will be described, with a thin layer of a metal chosen from the group including gold, silver, platinum, rhodium, palladium, and iridium.

Plating preferably is accomplished by covering the surface and pore walls of the coating 12 with a thermally decomposable compound of the metal chosen for the plating. The compound preferably is in the form of the halide or resinate salt of the chosen metal, and the required covering of the coating surfaces exposed to the atmosphere preferably is accomplished by impregnating the coating 12 with a solution of the resinate or halide.

The compound then is dried at, for example, 350° F. to 400° F. to remove the solvent employed therein, following which the coating 12 is baked or otherwise raised to a temperature high enough to effect decomposition of the compound, thus plating the metal on the surfaces and walls of the pores of the coating as at 18, 16, 17 (FIGURE 3). A temperature of 650° to 700° F. generally is sufficient. The temperature then, where desired, is further raised to approximately 2500° F. to bring about diffusion of the chosen metal into the coating and protected body as at 19, 20, 21. Alternatively, diffusion may be omitted, or may be obtained by the heat of the environment in which the protective body will be utilized.

Vacuum impregnation of the coating 12 (or coatings, as will appear later) with the thermally decomposable compound, followed by thermal decomposition, has yielded excellent results.

It will be found that the single, porous coating 12 of a refractory metal over the surface of the base body 10, when plated as described above, provides greatly increased resistance to oxidation and deterioration of the coating 12 and base body 10 in a hot, oxygen-containing environment. In the preferred form of the invention, however, a coat of heat-resistant metallic oxide 13 (aluminum oxide, hafnium oxide, etc.) is placed over the plated molybdenum (or other refractory metal) coating 12. Another porous layer 14 of molybdenum, etc., then is applied as before over the ceramic coating 13, following which the second molybdenum layer 14 is plated as before. This may be repeated a number of times to lay down as many as a dozen or more layers of oxide 13 interspersed with layers of molybdenum 14.

While the above-delineated method is efficacious in providing greatly improved protection of the base body 10, excellent protection is obtainable by forming a metal-ceramic laminated coating of interspersed refractory metal coatings 12, 14 and metallic oxide coatings 13 as disclosed in U.S. Patent No. 3,054,694. Since both the metal and metallic oxide layers are applied, in the molten state, by spraying, both types of coatings are porous. The completed, laminated coating 12, 13, 14 is impregnated with the halide or resinate salt solution called for above, the impregnation thus including the porous oxide coats 13 as well as the porous molybdenum coats 12, 14. After drying, the temperature of the metal-ceramic laminated coatings 12, 13, 14 is raised high enough to decompose the compound and plate the chosen metal on the walls, floors, and exposed surfaces of the porous metal and ceramic layers. Plating is followed, where desired, by a further increase of temperature sufficient to bring about the diffusion of the plated metal into the surfaces of the refractory metal layers. Where the protected body 10 is made of a strained-hardened refractory metal, too high a temperature will in some cases bring about an undesirable recrystallization of the refractory metal. In such cases the temperature utilized for the diffusion is kept below a temperature at which a significant degree of recrystallization would occur.

The above-disclosed method is relatively very practical and inexpensive since suitable ones of the materials mentioned are readily available and no special equipment beyond that common in the art is required. Whereas previous heat-protective coatings including chromizing, siliconizing, aluminum-silicon diffusion, silicon-boron diffusion, etc. have, except in small, specially prepared parts, proven less satisfactory than desired, the heat-resistant article prepared according to the present method is efficacious and reliable. Furthermore, articles of large size are readily prepared in production quantities because of the simplicity of the method and the absence of the need of special equipment, whereas the technics of applying the above-mentioned coatings have tended to restrict their application of only relatively small bodies.

To cite a specific example of preparation of a heat-resistant article according to a particular modification of the method, a graphite body was wire-brushed to prepare its surface for reception of a porous, refractory metal coating. A layer of molybdenum then was applied to a depth of 0.020 inch with a conventional metallizing gun. A gold halide solution was sprayed on the coating until the latter was well impregnated and was dried by baking for two hours; following this, the gold compound was thermally decomposed at 650°–700° F. for 1 hour.

After cooling, the part was tested in an oxidizing environment. Results were gratifying. Although unprotected portions of the graphite were badly eroded, the molybdenum-coated graphite face and the molybdenum coating were not oxidized or eroded although held at 4500° F. for 10 minutes and over 3000° F. for 25 minutes. Testing was in a fast-moving, hot, gaseous stream provided by a ram jet engine. In the very hot atmospheric environment, the precious metal was heated beyond its melting point but remained in place since it was in the form of a thin layer plated on the molybdenum, including the walls and floors of the latter. Not subject to oxidation itself, the gold blocked off oxygen from the molybdenum and graphite. It is believed that at least some of the gold diffused into the materials onto which it was plated, which materials continued to be provided with full resistance against oxidation.

While only one embodiment of the method of making the heat resistant article has been described herein together with several modifications thereof, it will be evident that various further modifications are possible in the steps of the method without departing from the scope of the invention.

I claim:
1. The method of protecting a body having a surface from the deleterious effects of high temperatures in an atmospheric environment comprising:
    forming a porous coating on the surface by spraying the surface with a molten, refractory metal;
    substantially covering the surface and the surfaces of the walls of the pores of the coating with a liquid solution of a thermally decomposable compound of a metal chosen from the group consisting of gold, silver, platinum, rhodium, palladium, and iridium;
    and raising the coating to a temperature high enough to effect thermal decomposition of the compound in situ and thereby plating the chosen metal onto the surface and the surfaces of the walls of the pores of the coating.

2. The method of protecting a body having a surface from the deleterious effects of high temperatures in an atmospheric environment comprising:
    forming a porous coating on the surface by spraying the surface with a molten, refractory metal;
    substantially covering the surface and the surfaces of the walls of the pores of the coating with a thermally decomposable halide salt of a metal chosen from the group consisting of gold, silver, platinum, rhodium, palladium, and iridium by impregnating the coating with a solution of the halide salt;
    drying the halide salt solution impregnating the coating;
    and raising the coating to a temperature high enough to effect thermal decomposition of the halide salt and thereby plating the chosen metal onto the surface and the surfaces of the walls of the pores of the coating.

3. The method of protecting a body having a surface from the deleterious effects of high temperatures in an atmospheric environment comprising:
    forming a porous coating on the surface by spraying the surface with a molten, refractory metal;

substantially covering the surfaces of the walls of the pores of the coating with a thermally decomposable halide salt of a metal chosen from the group consisting of gold, silver, platinum, rhodium, palladium, and iridium by impregnating the coating with a solution of the halide salt;

drying the halide salt solution impregnating the coating;

and raising the coating to a temperature high enough to effect thermal decomposition of the halide salt and thereby plating the chosen metal onto the surfaces of and the walls of the pores of the coating 4. The method of protecting a body having a surface from the deleterious effects of high temperatures in an atmospheric environment comprising:

forming a porous coating on the surface by spraying the surface with a molten, refractory metal;

substantially covering the surface and the surfaces of the walls of the pores of the coating with a thermally decomposable resinate salt of a metal chosen from the group consisting of gold, silver, platinum, rhodium, palladium, and iridium by impregnating the coating with a solution of the resinate salt;

drying the resinate salt solution impregnating the coating;

and raising the coating to a temperature high enough to effect decomposition of the resinate salt and thereby plating the chosen metal onto the surface and the surfaces of the walls of the pores of the coating.

5. The method of protecting a body having a surface from the deleterious effects of high temperatures in an atmospheric environment comprising:

forming a porous coating on the surface by spraying the surface with a molten, refractory metal;

substantially covering the surfaces of the walls of the pores of the coating with a thermally decomposable resinate salt of a metal chosen from the group consisting of gold, silver, platinum, rhodium, palladium, and iridium by impregnating the coating with a solution of the resinate salt;

drying the resinate salt solution impregnating the coating;

and raising the coating to a temperature high enough to effect decomposition of the resinate salt and thereby plating the chosen metal onto the surface and the walls of the pores of the coating.

6. The method of protecting a body having a surface from the deleterious effects of high temperatures in an atmospheric environment comprising:

forming a porous coating on the surface by spraying the surface with a molten, refractory metal;

substantially covering the surfaces of at least the walls of the pores of the coating with a liquid solution of a thermally decomposable compound of a metal chosen from the group consisting of gold, silver, platinum, rhodium, palladium, and iridium;

applying at least one porous, metallic oxide coating on the refractory metal coating;

forming a second porous coating on the at least one metallic oxide coating by spraying the metallic oxide coating with a molten, refractory metal;

substantially covering the surface of at least the walls of the pores of the second porous coating with the solution of the thermally decomposable compound;

and raising the porous, refractory metal coatings to a temperature high enough to effect thermal decomposition of the compound in situ to plate the chosen metal onto at least the surface of the walls of the pores of the refractory metal coatings.

7. In a method of protecting a body having a surface from the deleterious effects of high temperatures in an atmospheric environment wherein a plurality of porous coats of a refractory metal interspersed with porous metallic oxide coats are placed on the surface of the body, the steps comprising:

impregnating at least the pores of the refractory metal coats with a liquid solution of a thermally decomposable compound of a metal chosen from the group consisting of gold, silver, platinum, rhodium, palladium, and iridium;

and raising the refractory metal coats to a temperature high enough to effect decomposition of the compound and thereby plating the chosen metal onto at least the surface of the walls of the pores of the refractory metal coats.

8. In a method of protecting a body having a surface from the deleterious effects of high temperatures in an atmospheric environment wherein a plurality of porous coats of a refractory metal interspersed with porous metallic oxide coats are placed on the surface of the body, the steps comprising:

impregnating the porous refractory metal coats and porous metallic oxide coats with a liquid solution of a thermally decomposable compound of a metal chosen from the group consisting of gold, silver, platinum, rhodium, palladium, and iridium;

and raising the porous refractory metal and metallic oxide coats to a temperature sufficiently high to decompose the compound and thereby plating the walls of the pores of the refractory metal and metallic oxide coatings with the chosen metal.

9. The method of protecting a strain-hardened, refractory metal body having a surface from the deleterious effects of high temperatures in an atmospheric environment comprising:

forming a porous coating on the surface by spraying the surface with a molten, refractory metal;

substantially covering surfaces of the porous metal coating exposed to the atmosphere, including the walls of the pores of the coating, with a liquid solution of a thermally decomposable compound of a metal chosen from the group consisting of gold, silver, platinum, rhodium, palladium, and iridium;

and raising the coating and refractory metal body to a temperature too low to effect significant recrystallization in the refractory metal body and high enough to effect thermal decomposition of the compound in situ to plate the chosen metal onto the surfaces of the porous metal coating exposed to the atmosphere.

References Cited by the Examiner

UNITED STATES PATENTS

| | | | |
|---|---|---|---|
| 2,646,616 | 7/1953 | Davignon | 29—199 |
| 2,897,584 | 8/1959 | Schimpelt | 29—199 |
| 2,973,283 | 2/1961 | Hill. | |
| 3,006,782 | 10/1961 | Wheildon | 117—71 |
| 3,031,331 | 4/1962 | Aves | 117—70 X |
| 3,053,689 | 9/1962 | Shoudy et al. | |
| 3,054,694 | 9/1962 | Aves | 117—70 |
| 3,055,591 | 9/1962 | Shepard | 117—107.2 X |
| 3,069,288 | 12/1962 | Oxx et al. | |
| 3,113,885 | 12/1963 | Teague | 117—70 X |

MURRAY KATZ, *Primary Examiner.*

WILLIAM D. MARTIN, JOSEPH B. SPENCER,
*Examiners.*

R. S. KENDALL, J. P. McINTOSH, *Assistant Examiners.*